US008976060B2

(12) United States Patent
Schaffner

(10) Patent No.: US 8,976,060 B2
(45) Date of Patent: Mar. 10, 2015

(54) RF CHIRP SIGNAL PROPAGATION DELAY MEASUREMENT

(75) Inventor: Terry M. Schaffner, Warrenville, IL (US)

(73) Assignee: Digi International Inc., Minnetonka, MN (US)

( * ) Notice: Subject to any disclaimer, the term of this patent is extended or adjusted under 35 U.S.C. 154(b) by 739 days.

(21) Appl. No.: 13/208,599

(22) Filed: Aug. 12, 2011

(65) Prior Publication Data

US 2012/0300814 A1 Nov. 29, 2012

Related U.S. Application Data

(60) Provisional application No. 61/489,041, filed on May 23, 2011.

(51) Int. Cl.
| | | |
|---|---|---|
| *G01S 13/08* | (2006.01) | |
| *G01S 13/32* | (2006.01) | |
| *H04B 1/69* | (2011.01) | |
| *G01S 11/04* | (2006.01) | |
| *G01S 13/00* | (2006.01) | |
| *H04B 1/00* | (2006.01) | |

(52) U.S. Cl.
CPC . *H04B 1/69* (2013.01); *G01S 11/04* (2013.01); *H04B 2001/6912* (2013.01)
USPC .......... 342/132; 342/118; 342/125; 342/127; 342/128; 342/130; 342/131; 342/134; 342/135; 342/175; 342/195; 375/130; 375/153

(58) Field of Classification Search
CPC .............. G01S 7/02; G01S 7/28; G01S 7/42; G01S 13/02; G01S 13/06; G01S 13/08; G01S 13/10; G01S 13/103; G01S 13/106; G01S 13/24; G01S 13/26; G01S 13/28; G01S 13/282; G01S 13/284; G01S 13/286; G01S 13/32; G01S 13/34; G01S 13/342; G01S 13/343; G01S 13/345; G01S 13/347; G01S 13/348; G01S 13/36; G01S 13/38; G01S 13/40; G01S 13/74; G01S 13/76; G01S 13/78; G01S 13/785; G01S 13/788; G01S 13/87; G01S 13/872; H04B 1/69; H04B 1/692; H04B 1/707; H04B 1/713; H04B 1/7163
USPC ............. 342/82, 89, 125, 128–133, 175, 195, 342/29–51, 192–194, 196–197, 200–204, 342/134, 135; 702/127, 155, 158, 159; 375/130–153, 377, 316, 340–343
See application file for complete search history.

(56) References Cited

U.S. PATENT DOCUMENTS

| | | | | |
|---|---|---|---|---|
| 3,344,426 | A | * | 9/1967 | Long .............................. 342/132 |
| 3,889,258 | A | * | 6/1975 | Holmes et al. ................ 342/125 |
| 3,969,725 | A | * | 7/1976 | Couvillon et al. .............. 342/47 |
| 4,037,159 | A | * | 7/1977 | Martin .......................... 375/343 |

(Continued)

*Primary Examiner* — Bernarr Gregory
(74) *Attorney, Agent, or Firm* — Fogg & Powers LLC

(57) ABSTRACT

Distance between two radio frequency devices is estimated by receiving a plurality of spread spectrum chirp signals frequency offset from one another, and evaluating the received plurality of spread spectrum chirp signals for relative phase shifts between the plurality of spread spectrum chirp signals. A fine propagation time is derived using the phase shifts between the spread spectrum chirp signals. A frequency domain despreading window is shifted to reduce the influence of time-delayed near multipath signals in receiving the plurality of spread spectrum chirp signals.

13 Claims, 9 Drawing Sheets

(56) References Cited

U.S. PATENT DOCUMENTS

| | | | | |
|---|---|---|---|---|
| 4,100,498 A | * | 7/1978 | Alsup et al. | 375/139 |
| 4,309,703 A | * | 1/1982 | Blahut | 342/132 |
| 4,320,514 A | * | 3/1982 | Haskell | 375/136 |
| 5,019,825 A | * | 5/1991 | McCorkle | 342/201 |
| 5,381,444 A | * | 1/1995 | Tajima | 375/141 |
| 5,532,701 A | * | 7/1996 | Biella | 342/47 |
| 5,550,549 A | * | 8/1996 | Procter et al. | 342/47 |
| 5,561,686 A | * | 10/1996 | Kobayashi et al. | 375/134 |
| 5,748,891 A | * | 5/1998 | Fleming et al. | 375/150 |
| 5,844,934 A | * | 12/1998 | Lund | 370/342 |
| 6,002,708 A | * | 12/1999 | Fleming et al. | 375/130 |
| 6,111,536 A | * | 8/2000 | Richards et al. | 342/125 |
| 6,295,019 B1 | * | 9/2001 | Richards et al. | 342/125 |
| 6,385,268 B1 | * | 5/2002 | Fleming et al. | 375/377 |
| 6,400,754 B2 | * | 6/2002 | Fleming et al. | 375/140 |
| 6,674,396 B2 | * | 1/2004 | Richards et al. | 342/125 |
| 6,795,491 B2 | * | 9/2004 | Fleming et al. | 342/125 |
| 6,922,166 B2 | * | 7/2005 | Richards et al. | 342/125 |
| 7,215,698 B2 | * | 5/2007 | Darby et al. | 375/135 |
| 8,275,572 B2 | * | 9/2012 | Burns et al. | 702/158 |
| 8,611,396 B2 | * | 12/2013 | Park et al. | 375/135 |

* cited by examiner $$701 \sim \emptyset_0 = \tan^{-1}(imag\{C^+ + C^-\}/real\{C^+ + C^-\})/2\pi$$

$$702 \sim \Delta\emptyset_{-1} = \frac{\tan^{-1}\left(\frac{imag\{C^-\}}{real\{C^-\}}\right)}{2\pi} - \emptyset_0$$

$$703 \sim \Delta\emptyset_{+1} = \frac{\tan^{-1}\left(\frac{imag\{C^+\}}{real\{C^+\}}\right)}{2\pi} - \emptyset_0$$

$$704 \sim k = 2(\Delta\emptyset_{+1} - \Delta\emptyset_{-1})$$

$$705 \sim \emptyset_0 = \tan^{-1}(imag\{C^0\}/real\{C^0\})/2\pi$$

Fig. 7

RF CHIRP SIGNAL PROPAGATION DELAY MEASUREMENT

CLAIM OF PRIORITY

This patent application claims the benefit of priority, under 35 U.S.C.§119(e), to Terry Michael Schaffner, U.S. Provisional Patent Application Ser. No. 61/489,041, entitled "RF CHIRP SIGNAL PROPAGATION DELAY MEASUREMENT," filed on May 23, 2011, which is hereby incorporated by reference herein in its entirety.

FIELD

The invention relates generally to wireless communication signals, and more specifically in one embodiment to RF chirp signal propagation delay measurement.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Many of today's computers, cellular telephones, and other such devices rely on wireless communication to exchange information with other devices, such as to surf the Internet, send and receive email, and communicate audio and video. A modern cellular telephone, for example, may include a cellular phone modem to place and receive calls, a GPS receiver to determine physical location, a Wi-Fi interface that enables the device to join a Wi-Fi network and surf the Internet, as well as a Bluetooth interface that couples to an earpiece or car audio system for making phone calls.

Cellular telephones and other such devices have in only a couple decades gone from being obscure and expensive luxuries to replacing traditional land-line telephones. It is increasingly common for people to carry a cellular phone with them nearly wherever they go, constantly having access to not only phone functionality, but also the ability to send text messages and emails, use GPS or mapping features, and run a variety of applications.

GPS is useful in that it enables a person to determine where they are, overlay their location on a map, and get directions. GPS signals are often also used by other applications, such as a restaurant review application that shows reviews of restaurants near a user, or a shopping application that shows stores near a user that have a particular item for sale.

But, GPS signals are difficult to receive in some cities with tall buildings or other interference, and GPS is often left out of lower cost devices. Some devices therefore use cellular phone towers or other radio signals having known location to use as a reference, and can determine approximate position of a mobile radio device by estimating the distance from the mobile wireless device to multiple cellular towers. But, factors such as multipath signals where a cellular phone tower's signal is reflected off a building or other object can complicate methods such as these, resulting in inaccurate distance determinations and position determination.

For these and other reasons, it is desired to accurately measure the RF signal propagation delay between two devices.

SUMMARY

Some example embodiments of the invention comprise determining the distance between two radio frequency devices by receiving a plurality of spread spectrum chirp signals frequency offset from one another, and evaluating the received plurality of spread spectrum chirp signals for relative phase shifts between the plurality of spread spectrum chirp signals. A fine propagation time is derived using the phase shifts between the spread spectrum chirp signals. In a further example, a frequency domain despreading window is shifted to reduce the influence of time-delayed near multipath signals in receiving the plurality of spread spectrum chirp signals.

BRIEF DESCRIPTION OF THE FIGURES

FIG. 7 shows calculation chirp phases, consistent with an example embodiment of the invention.

DETAILED DESCRIPTION

Figure 1:
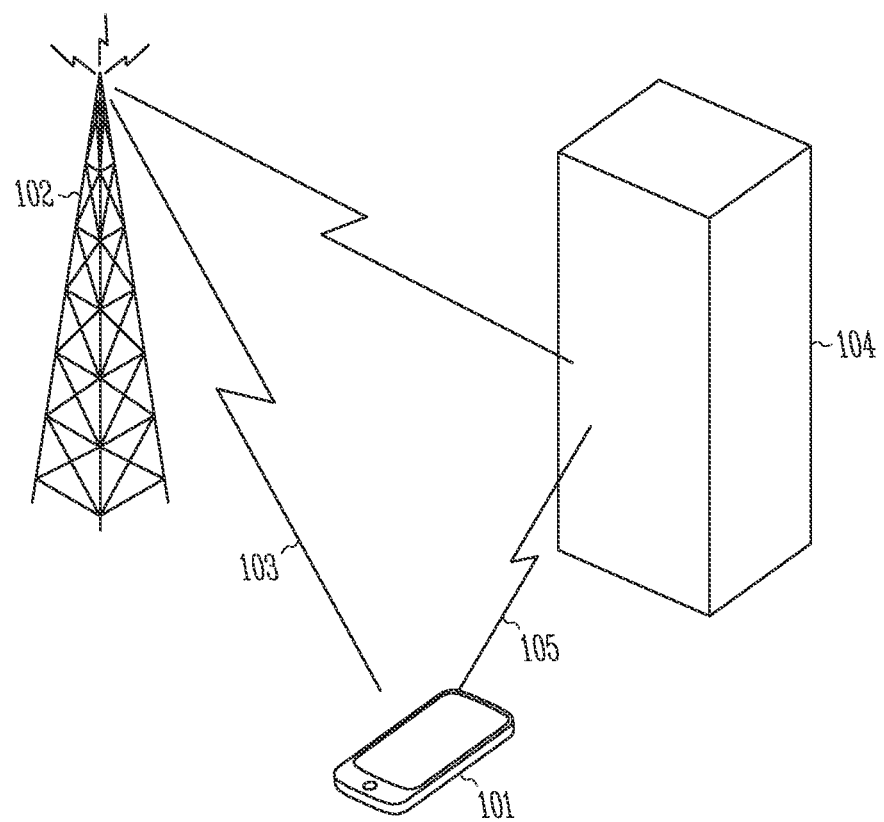
FIG. 1 shows such a multipath environment, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Accurately measuring the distance between two radio frequency devices has a variety of applications, from determining location using terrestrial systems like Long Range Navigation (LORAN) and satellite systems such as Global Positioning System (GPS), to determination of a cell phone's location when GPS data is unavailable.

Although many complex cell phones and other devices incorporate GPS and use it for providing navigation and other location-based services, many phones and other devices lack GPS and other sophisticated functions but can still make use of location information if available. For example, enhanced 911 cellular phone systems can provide the location of the cell phone to a 911 operator if the cellular phone is capable of determining its position.

Location determination using systems such as GPS or LORAN typically relies upon being able to accurately determine the distance between a receiver device and multiple transmitters. If the time is accurately coordinated between a GPS receiver and three GPS satellites, the distance from the GPS receiver to each of the three satellites can be determined by measuring the time it takes a radio signal to travel from each of the satellites to the receiver, thereby revealing the GPS receiver's location relative to the three satellites.

Determination of a cellular phone device's location without incorporating a GPS receiver into the phone relies in some embodiments on determining the distance between the cellular phone device and a cellular network tower. But, accurate measurement of the distance between a receiver and cellular telephone towers is often complicated by multipath or reflected signals such as signals bouncing off buildings, and other such interference in a typical urban environment.

Some embodiments of the invention therefore provide determination of distance between two RF devices by detecting the first or prompt ray of the RF communication signal by distinguishing the prompt ray from a delayed or reflected multipath ray. Further examples include implementing such a system in relatively simple devices using half duplex radios, such as where a handset or other device is only operable to either send or receive at any given time.

Measurement of a device's location where a device does not share a precision timing reference with reference RF device such as GPS satellites or cell phone towers can be achieved by measuring a round trip signal's time of flight if the time it takes for the receiving device to retransmit the signal is known. For example, it may take a signal transmitted from a cell phone several microseconds to reach a cell phone tower, which takes a known amount of time to retransmit the signal, again taking several microseconds to return to the cell phone. The known amount of time to retransmit can be subtracted from the time the cell phone measures between transmitting and receiving the signal, leaving only the several microseconds it takes the signal to travel to and from the cell phone tower as measured delay. This delay can then be used along with the known propagation speed of the RF signal to determine the distance between the cell phone and the cell phone tower.

This method works somewhat more poorly if there are strong RF signal reflections present, such as where either the cell phone tower or the cellular phone user is located near a building. Detecting the exact time of arrival of the signal can be difficult, particularly when the reflected signal is stronger or similar in strength to the prompt ray or direct signal path.

FIG. 1 shows such a multipath environment, consistent with an example embodiment of the invention. Here a wireless device 101 such as a cellular telephone is in communication with a cellular phone network tower 102. The most direct path between the cellular phone 101 and the tower 102 is described as the prompt ray 103, and is the desired path of the signal traveling between the cellular phone and the tower. Tracking the time it takes a radio signal traveling at a known speed between the cell phone and the tower enables determination of the distance of the prompt ray 101.

But, if the prompt ray cannot be easily distinguished, such as where other radio signal paths interfere with clear reception of the prompt ray 103, the time of flight of the radio signal can be distorted resulting in distortion of the derived distance between the cellular phone and the tower. Here, a building 104 provides significant reflection of the radio signals between the cell phone 101 and tower 102, resulting in another strong signal path 105 that is significantly longer than the prompt ray 103. If this reflected signal, often called a multipath signal, is the signal used to determine the distance from the cell phone to the tower, the distance from the cell phone to the building plus the distance from the building to the tower may instead be inadvertently determined based on the time of flight of the multipath signal. The multipath signal 105 can similarly interfere with clear determination of the timing of the prompt ray, resulting in other types of distortion of the determined distance or inability to determine a distance.

For reasons such as these, some embodiments of the invention provide a method of providing more accurate radio frequency ranging in the presence of multipath signals. This is achieved in various embodiments by using chirp spreading at multiple frequency offsets, using relative phase measurements of the despread chirp symbols to provide fine timing information, and using a window positioned to minimize the influence of near multipath signals.

As seen in the example of FIG. 1, use of a simple signal such as a sine wave can lead to uncertainty as to the timing or phase of the sine wave signal being received, and superimposition of a multipath or reflected sinusoid onto a prompt ray sinusoid can lead to difficulty in distinguishing the prompt ray from the multipath ray. In some examples of the invention, a chirp signal is therefore used, which in a further embodiment is long relative to the cycle length of the chirp frequencies, eliminating problems with being at or near multiples of a cycle off.

Figure 2:
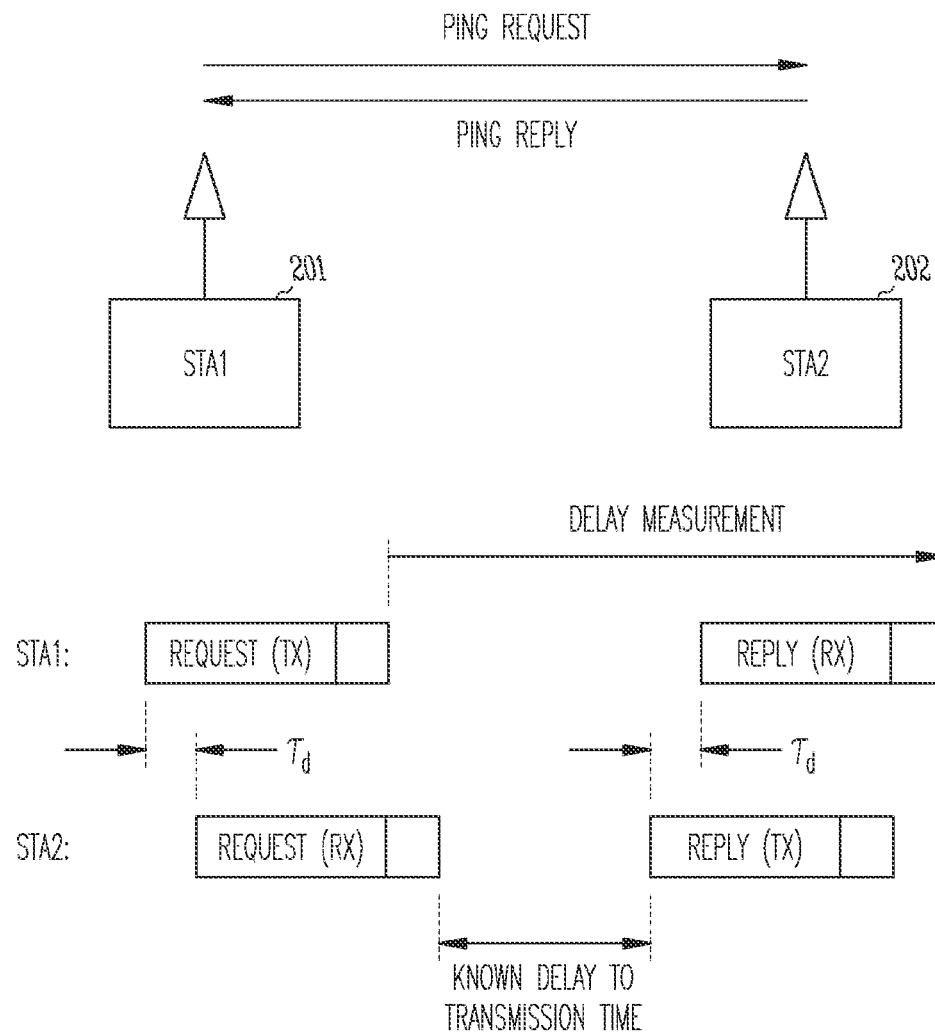
FIG. 2 shows a more detailed method of ranging between two RF devices, consistent with some example embodiments of the invention.

FIG. 2 shows a more detailed method of ranging between two RF devices, consistent with some example embodiments of the invention. Here, station 1 shown at 201 sends a ranging request signal to station 2. Station 2 receives the request after a time of flight of the prompt ray t(d), and after a known amount of time replies with a reply signal. The second station 202 also takes a known amount of time to send the reply signal, which takes the same time of flight t(d) to return to station 1. The known delays can then be subtracted from the time observed between the request and the reply in station 1, resulting in two times t(d), such that t(d) can be used along with the known speed of propagation of an RF signal to determine the distance between station 1 at 201 and station 2 at 202.

In a further example, the relative oscillator inaccuracies between stations is estimated, as the delay introduced by station 2 will be dependent on its oscillator rather than on station 1's oscillator and can lead to inaccuracies. An accurate estimate of the relative time base error can be calculated based on the frequency offset estimate and the known carrier frequency. Once this error is removed, the only time-base error is the absolute error of station 1's oscillator. In the case of a 50 ppm oscillator, this will introduce a small error of up to 50 ppm of the distance measurement.

Figure 3:
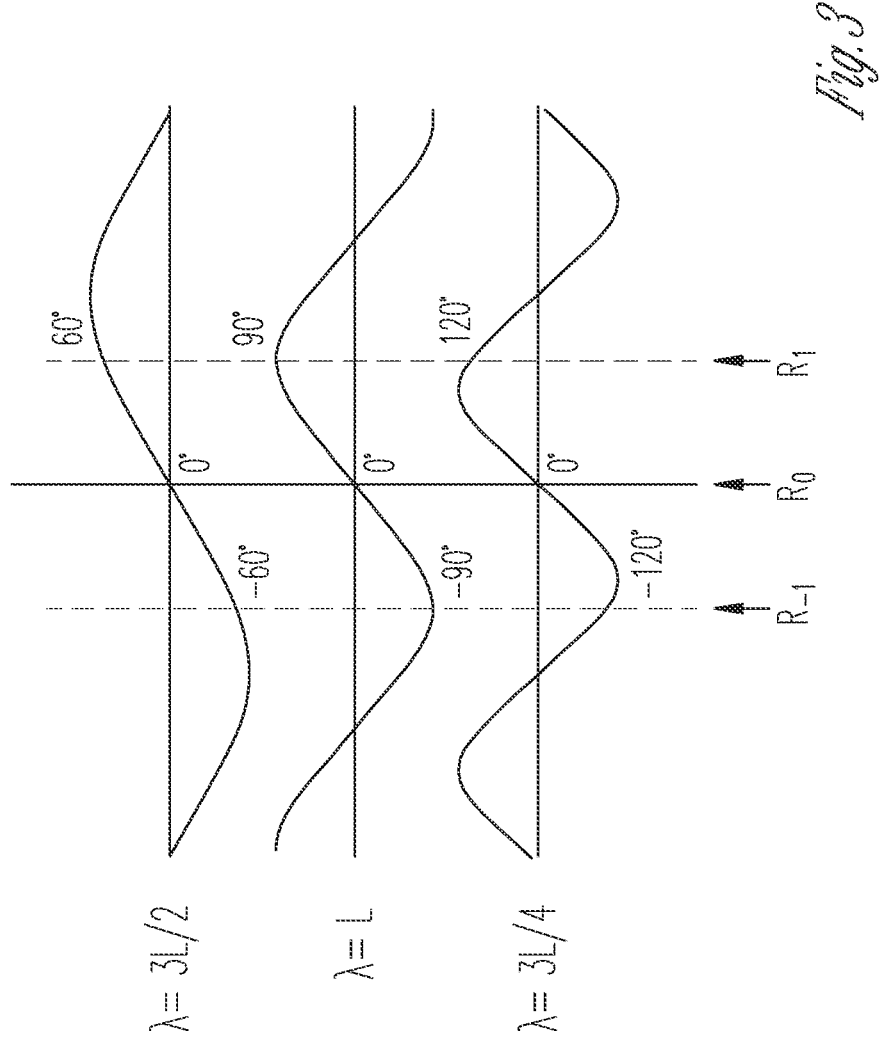
FIG. 3 illustrates use of sinusoidal waveform phase evaluation to perform ranging, consistent with the prior art.

FIG. 3 illustrates use of sinusoidal waveform phase evaluation to perform ranging, consistent with the prior art. Here, three sinusoidal waveforms with different wavelengths arrive at a receiver. In this example, we assume the three tones were all transmitted at a phase of 0 degrees at time $T_0$. If the received signal is sampled at time $R_0$, as shown at 301, the phases of all three tones are equal to 0. The timing at the receiver is then aligned with the transmission at time $T_0$. The RF delay is therefore simply equal to $R_0$-$T_0$.

If, on the other hand, the receiver samples the tones slightly later at time $R_1$ the three phases are no longer equal. In this case, the higher frequency tone has a phase shift of +30 degrees relative to the center frequency tone, and the lower frequency tone has a phase shift of −30 degrees relative to the center frequency tone. The RF delay may be computed as $(R_n-T_0)-\Delta\emptyset/(2\pi\Delta f)$, where $\Delta\emptyset$ is the difference in phase (radians) between the two tones and $\Delta f$ is the difference in frequency (Hertz) between the two tones. This example illustrates how more than two tones may be transmitted to increase the measurement range and prevent aliasing.

In a typical RF environment the signal may reflect off objects in the vicinity as shown in FIG. 1, and the direct path to the receiver may be obstructed by walls or other objects. This multipath at the receiver will result in large inaccuracies in the phase measurement. Multipath can cause the tones to fade in amplitude and shift in phase independently from one another.

Some embodiments of the invention therefore transmit a wider bandwidth spread spectrum signal instead of the discrete tones to reduce the effects of multipath. Since delayed shifts of a spread spectrum signal are uncorrelated with one another, the effect of multipath upon the phase measurements will be greatly reduced.

Figure 4:
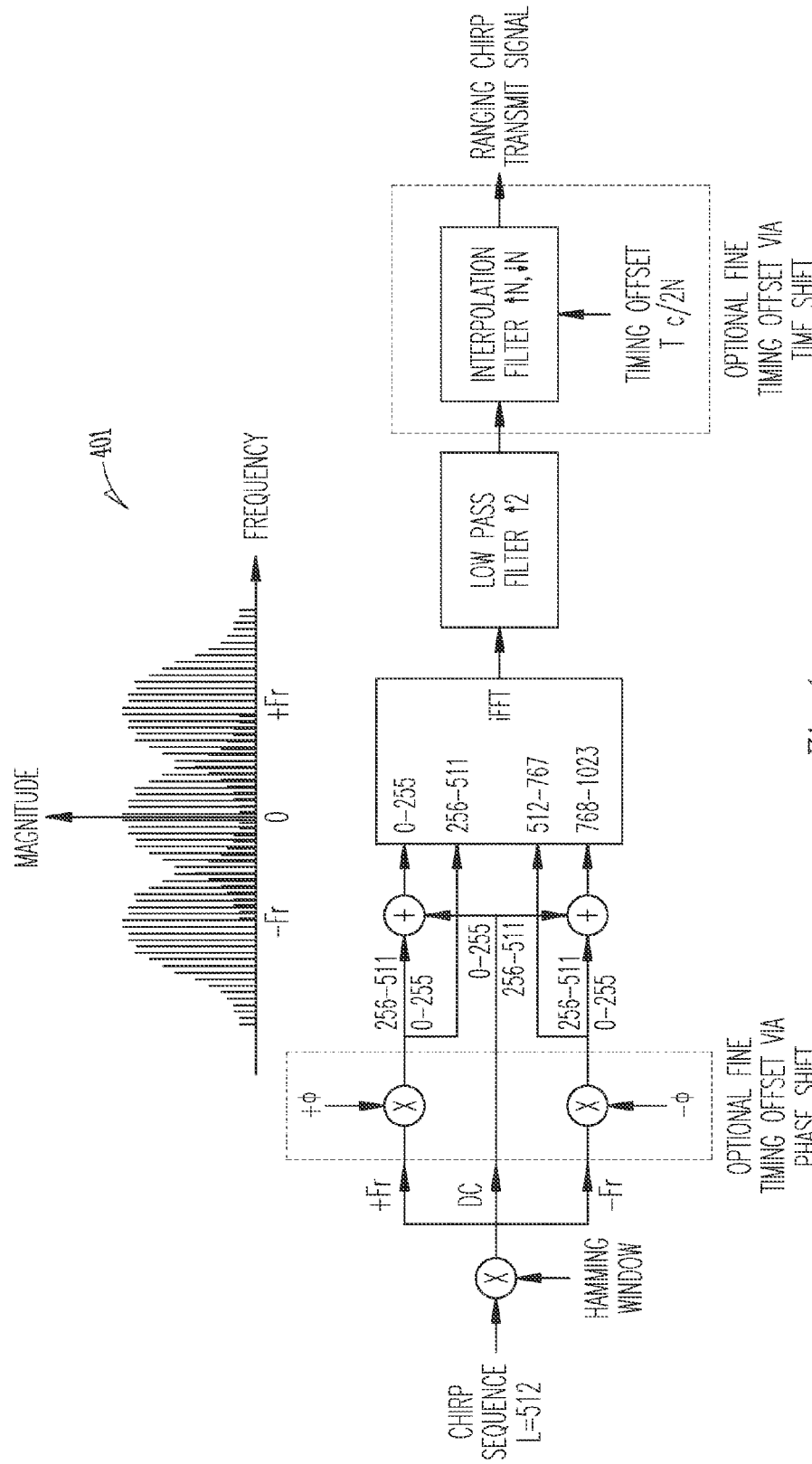
FIG. 4 shows a multi-frequency chirp transmitter and the spectrum of the transmitted signal, consistent with an embodiment of the invention.

FIG. 4 shows a multi-frequency chirp transmitter and the spectrum of the transmitted signal, consistent with an embodiment of the invention. In this example, three un-modulated, length 512 chirp sequences are transmitted as the ranging signal. The chirps are centered at frequencies of −Fr, 0, and +Fr. The first chirp sweeps from −2Fr to 0, the second sweeps from −Fr to +Fr, and the third sweeps from 0 to +2Fr as shown at 401. The chirp sequences in this example are transmitted simultaneously but they may also be transmitted individually at separate times. To create the transmit signal a length 512 complex chirp sequence is generated and then multiplied by a real-valued length 512 windowing function. When transmitting the range reply signal, the fine timing of the transmission may be set by either introducing phase offsets on the chirp waveforms or by adjusting the time delay using an interpolation/decimation filter. These are shown as optional functions on the block diagram.

The windowed chirp sequence is replicated three times and fed to a length 1024 inverse FFT to convert the signal to the time domain. Note that a chirp sequence in the frequency domain is equivalent to the complex conjugate of the chirp sequence in the time domain. Therefore, transforming a chirp sequence in the frequency domain to the time domain simply creates a chirp sequence that sweeps in the opposite direction. The composite signal is then filtered with an up-sampling low pass filter and optionally delayed with a fine timing interpolation filter.

To measure the propagation delay, the arrival of the prompt ray is estimated with a high degree of accuracy. A spreading code with a 20 MHz bandwidth provides a resolution of only 50 nanoseconds; this is roughly fifty feet in terms of distance. In order to achieve sub-chip timing accuracies three half-bandwidth chirps are transmitted offset in frequency by 0, +Fr, and −Fr, where Fr is equal to one-fourth the transmission bandwidth, BW.

When the transmitting station sends the range request signal, the three chirps are sent with the same phase. At the receiver, if the chirps are de-spread with perfect alignment to the received signal, the three phases will be identical. If the receive signal is offset in time, the three phases will shift due to the frequency offset of each chirp signal. Using a combination of the chip offset and the chirp phases, the propagation delay of the RF signal can be very accurately estimated.

Chirp spreading reduces the influence of multipath on the measurement; note, however, that multipath with delays less than a chip period from the prompt ray may still interfere with the measurement.

Figure 5:
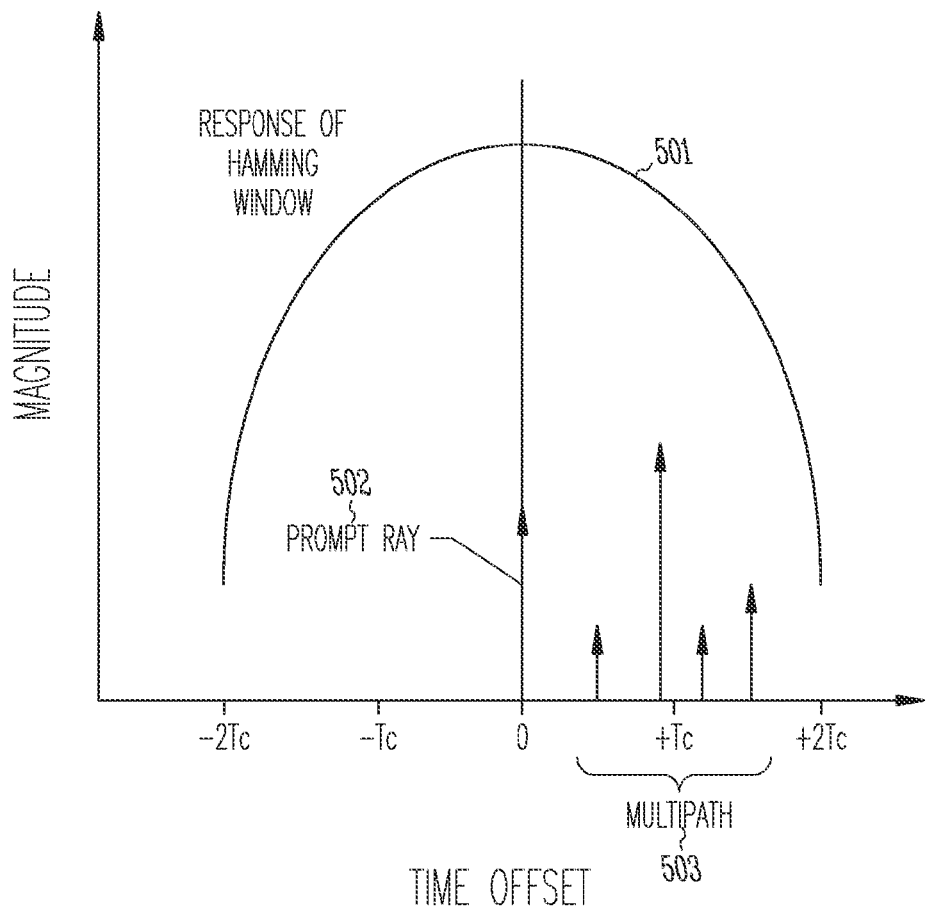
FIG. 5 shows an example of multipath or reflected rays less than a chirp period from the prompt ray interfering with prompt ray reception, consistent with an example embodiment of the invention.

FIG. 5 shows an example of multipath or reflected rays less than a chirp period from the prompt ray interfering with prompt ray reception, consistent with an example embodiment of the invention. The magnitude response of the hamming window is shown at 501, centered around the prompt ray 502. Any multipath 503 within this window will combine with the prompt ray and potentially interfere with the measurement.

Figure 6:
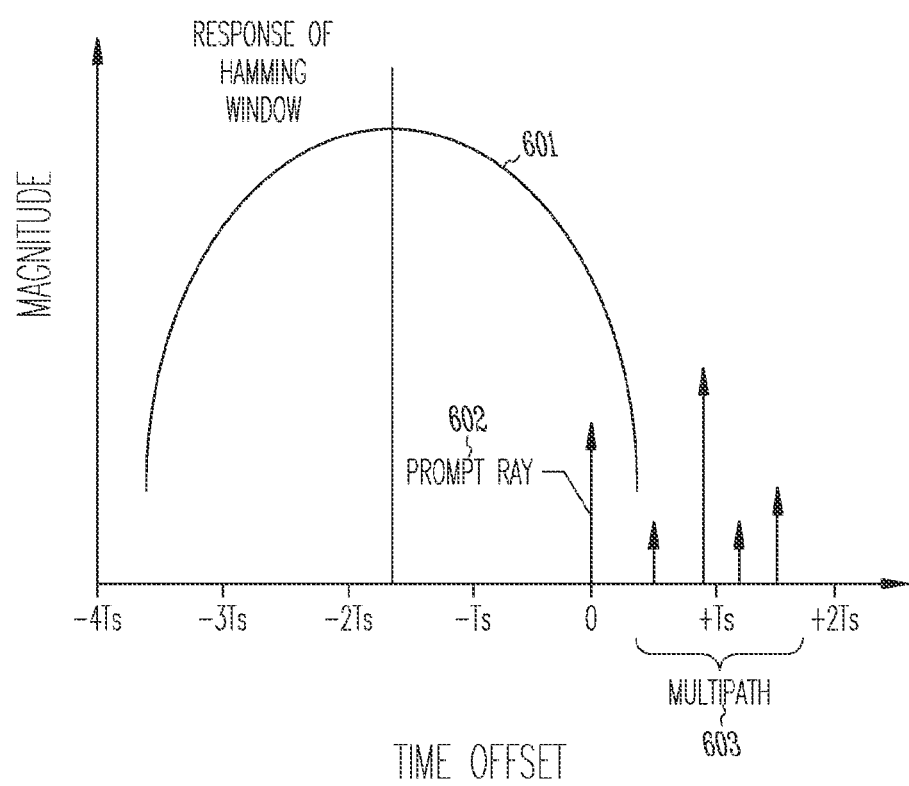
FIG. 6 illustrates shifting the hamming window despreading offset to minimize multipath interference with the prompt ray, consistent with an example embodiment of the invention.

FIG. 6 illustrates shifting the hamming window despreading offset to minimize multipath interference with the prompt ray, consistent with an example embodiment of the invention. In order to minimize the effects of the nearby multipath seen in FIG. 5, the de-spread offset is advanced as much as is practical while still maintaining an accurate phase measurement. The offset in a more detailed example is advanced until the de-spread energy drops to a pre-determined threshold level. At this offset, the phase measurement takes place. This results in the hamming window capturing the prompt ray 602, while greatly attenuating or excluding the multipath signals 603.

The phase measurement is important for providing an accurate measurement. The relative phases of the frequency chirps reflect the de-spread timing offset with respect to the received ray. This is a direct consequence of the two chirp signals having a non-zero center frequency. The chirp centered at −BW/4 will experience a phase shift of $-\pi k/2$ radians, where k is the time difference between the ray and the de-spread offset in units of Ts. Likewise, the chirp centered at +BW/4 will experience a phase shift of $+\pi k/2$ radians. The third chirp signal located at 0 Hz is used as a phase reference and does not experience a phase shift when the de-spread offset changes.

FIG. 7 shows calculation of chirp phases, consistent with an example embodiment of the invention. Here, the reference phase, $\emptyset_0$ is calculated at 701, and the delta phases for the negative frequency centered chirp at 702 and positive frequency centered chirp at 703. In the equations, $C^0$ is the complex despread value for the zero frequency centered or DC chirp, $C^-$ is the complex despread value for the negative frequency centered chirp and $C^+$ is the complex despread value for the positive frequency centered chirp. The fine timing offset, k, can then be calculated as shown at 704.

To extend the phase measurement range in a further example, a third chirp symbol is added at DC, and a reference phase is calculated from the DC chirp as shown at 705.

The raw timing measurement is then the coarse timing offset corresponding to the point of the delay measurement minus this fine timing value. In order to calculate the over-the-air propagation delay, the internal path delays of both radios is also subtracted. In addition, the delay is adjusted based on the estimate of the relative oscillator inaccuracies between the two radios as with the example of FIG. 2.

The effect of multipath on the de-spread prompt ray at the receiver is minimized by selecting a timing offset near the estimated location of the prompt ray. The location is based upon the estimated channel impulse response. One method for determining the approximate prompt ray offset is to select the earliest arriving offset whose energy is above a threshold.

The threshold can then be calculated relative to the maximum energy offset or relative to the composite signal energy.

At this timing offset, a block of data is buffered and transformed into the frequency domain. The data from the FFT is separated into the proper frequency band for each chirp, and then the data is de-spread in the frequency domain. Note that frequency domain de-spreading is almost identical to time domain de-spreading because a chirp signal in the frequency domain is simply the complex conjugate of the signal in the time domain. The signal is de-spread by correlating the data with a chirp sequence.

It is desirable to attenuate any multipath following the prompt ray in order to obtain a reliable phase measurement of the prompt ray signal. This is accomplished by advancing the time offset as illustrated previously in FIG. 6. However, each time the time offset is adjusted, a computation-intensive FFT is performed. In order to avoid this complexity, some embodiments of the invention employ a method in which the FFT window is effectively moved but the timing offset remains stationary. This is accomplished by multiplying each band of FFT output data by a near-DC complex sinusoid. The frequency of the complex sinusoid is adjusted to position the window such that the prompt ray's phase can be measured with little influence from any nearby multipath. The frequency is adjusted until the de-spread energy of the chirp symbols are within a given range. At this point, the phase of the de-spread chirp symbols is measured. The phases reflect the fine timing offset of the prompt ray relative to the coarse data buffer timing.

The station receiving the range request signal responds with a range reply transmission at a known delay following the request. The timing of the transmission is precise, so that the round trip delay estimate is accurate. The transmit timing can be conveyed in different manners, including:
1. The transmission time of the range reply signal is precisely set using a high rate interpolation/decimation filter
2. The transmission time of the range reply signal is set coarsely (e.g., a Nyquist sample period or half sample period) and the fine transmission time offset is conveyed by shifting the phase of the chirp symbols.
3. The transmission time of the range reply signal is set coarsely (e.g., a Nyquist sample period or half sample period) and the fine transmission time offset is conveyed in a data message.

In the example presented here, the third option is used, sending the fine timing offset information in a data portion of the range reply frame.

Figure 8:
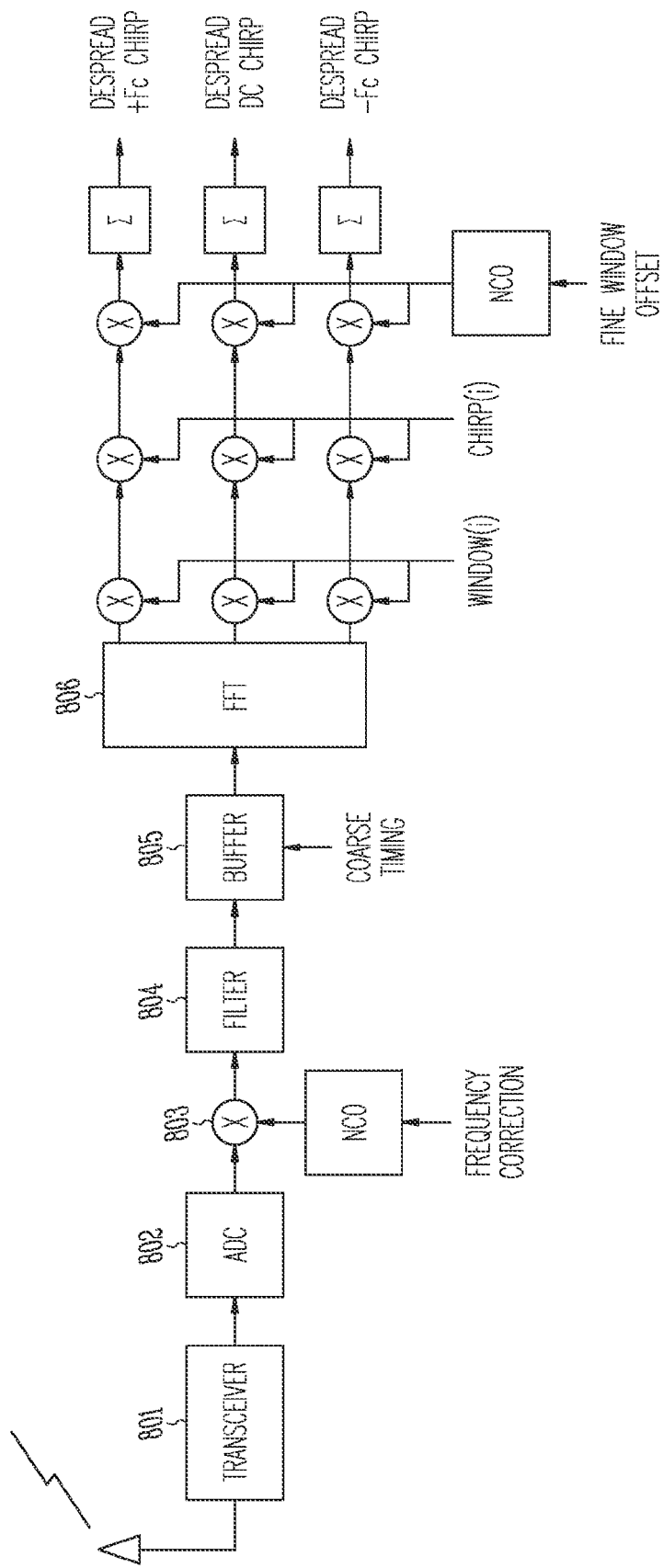
FIG. 8 shows a block diagram of a ranging receiver, consistent with an example embodiment of the invention.

FIG. 8 shows a block diagram of a ranging receiver, consistent with an example embodiment of the invention. Here, a transceiver 801 down converts the RF signal to a 0 Hz IF signal (baseband signal). An ADC 802 converts the analog baseband signal to a digital signal. Any frequency offset error is corrected by multiplying the baseband signal with a complex sinusoid generated by a numerically-controlled oscillator (NCO) at 803. The data is then low-pass filtered at 804 and buffered at 805 to create a block of data (length of 1024 in this example).

The block of data feeds a 1024 point FFT at 806, which converts the time domain data into the frequency domain. The FFT output is separated into three bands: the upper band centered at +Fc which uses FFT output bins 0 through 511, the middle band centered at DC (0 Hz) which uses FFT output bins 0 through 255 and 768 through 1023, and the lower band centered a −Fc which uses FFT output bins 512 through 1023.

The data for each of the three frequency bands is multiplied by a windowing function and the chirp sequence. The data is then multiplied a third time by a complex sinusoid fed by an NCO. Finally, the 512 data samples for each frequency band are accumulated to provide the de-spread chirp values. The frequency of the NCO is adjusted based upon the energy of the de-spread chirp symbols. Once the desired energy level is achieved, the phases of the three de-spread chirp values are measured. The phase values provide the fine timing offset of the prompt ray relative to the coarse offset. Note that the chirp phase and NCO phase are combined to eliminate one of the complex multiply operations in a further example.

Figure 9:
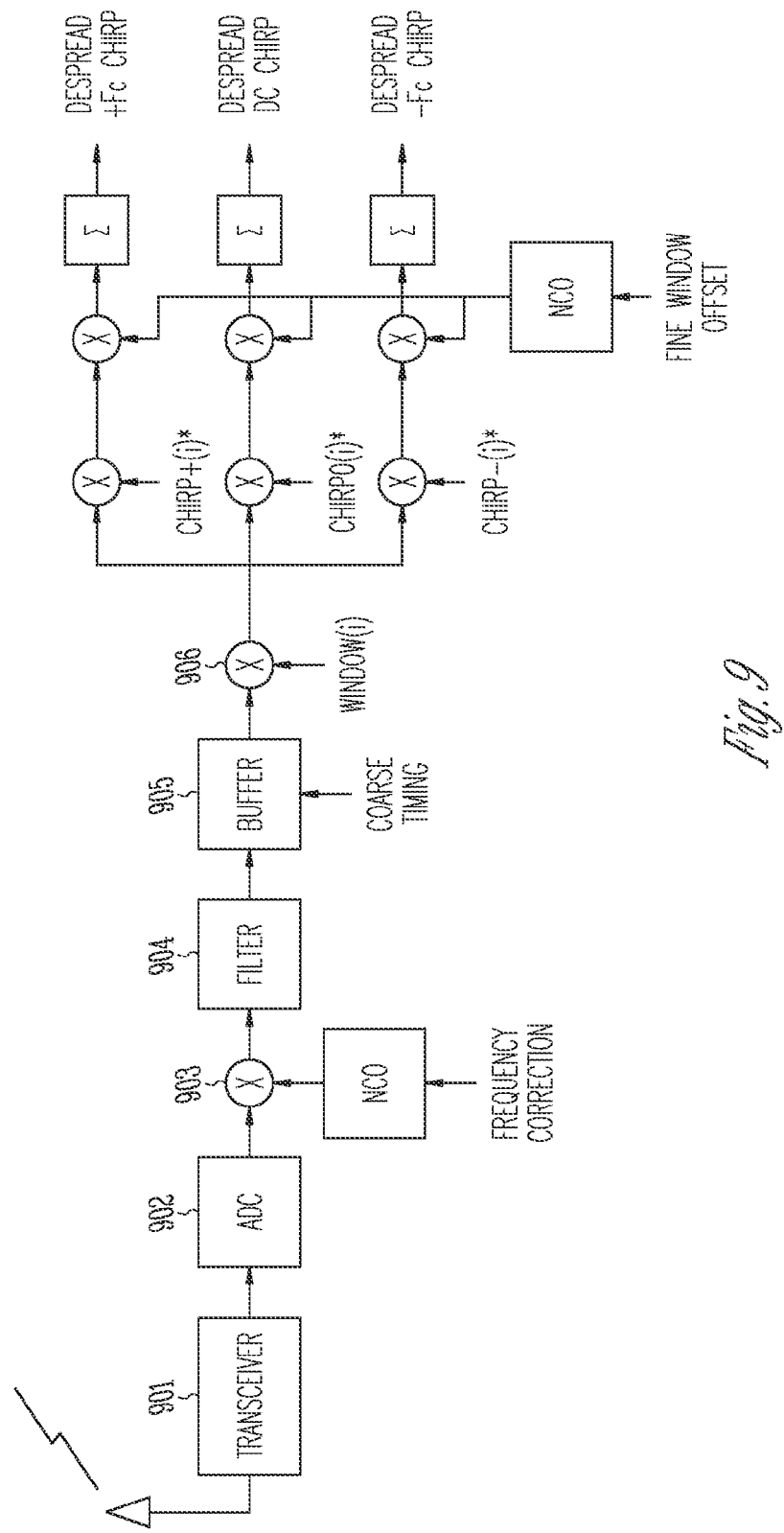
FIG. 9 shows a block diagram of an alternate ranging receiver, consistent with an example embodiment of the invention.

FIG. 9 is a block diagram of an alternate implementation of a ranging receiver, consistent with an example embodiment of the invention. In this example, the signal is despread in the time domain eliminating the need for a fast fourier transform. The block of data at the output of buffer 905 is multiplied by the windowing function by multiplier 906. This data is then multiplied by the complex conjugate of the expected data sequences. The data sequence chirp0 is the chirp signal generated at the sampling rate of the received block of data. The data sequence, chirp+, is the chirp0 sequence multiplied by a positive frequency offset of +Fc; likewise, chirp− is the chirp0 sequence multiplied by a negative frequency offset of −Fc. Similar to the frequency domain implementation shown in FIG. 8, the three signals are multiplied by a complex sinusoid and then accumulated to produce the despread symbols.

With the time domain implementation of FIG. 9, there may be some degradation in accuracy. The timing offset of the buffered data may not align precisely with the received symbols resulting in a misalignment of the windowing function. However, when using long chirp sequences this degradation is fairly insignificant. In either implementation it may also be desirable to compensate for any non-linear phase or magnitude variations in the response of the radio's signal path. This may be accomplished by multiplying the received block of data by a complex data sequence derived from measuring the channel response of the radio.

These examples illustrate how distance between two radio frequency devices can be estimated by receiving a plurality of spread spectrum chirp signals frequency offset from one another, and evaluating the received plurality of spread spectrum chirp signals for relative phase shifts between the plurality of spread spectrum chirp signals. A fine propagation time is derived using the phase shifts between the spread spectrum chirp signals. In a further example, a frequency domain despreading window is shifted to reduce the influence of time-delayed near multipath signals in receiving the plurality of spread spectrum chirp signals.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:
1. A method of estimating a distance between two radio frequency devices, comprising:
 transmitting a plurality of spread spectrum chirp signals frequency offset from one another from a first radio frequency device;

receiving the plurality of spread spectrum chirp signals in a second radio frequency device;
evaluating the received plurality of spread spectrum chirp signals for relative phase shifts between the plurality of spread spectrum chirp signals; and
deriving a fine propagation time between the first and second devices using the phase shifts between the spread spectrum chirp signals.

2. The method of estimating a distance between two radio frequency devices of claim 1, further comprising determining a coarse propagation time established by propagation delay of at least one of the plurality of chirp signals plus known processing delays, and combining the coarse propagation delay and the fine propagation time to establish an accurate propagation time.

3. The method of estimating a distance between two radio frequency devices of claim 1, further comprising shifting a frequency domain despreading window in the receiver to reduce the influence of time-delayed near multipath signals in receiving the plurality of spread spectrum chirp signals.

4. A radio frequency ranging system, comprising:
a first device operable to transmit a plurality of spread spectrum chirp signals frequency offset from one another;
a second device operable to receive the plurality of spread spectrum chirp signals, the second device further operable to evaluate the received plurality of spread spectrum chirp signals for relative phase shifts between the plurality of spread spectrum chirp signals and derive a fine propagation time between the first and second devices using the phase shifts between the spread spectrum chirp signals.

5. The radio frequency ranging system of claim 4, the receiver further operable to determine a coarse propagation time established by propagation delay of at least one of the plurality of chirp signals plus known processing delays, and combine the coarse propagation delay and the fine propagation time to establish an accurate propagation time.

6. The radio frequency ranging system of claim 4, the receiver further operable to shift a frequency domain despreading window in the receiver to reduce the influence of time-delayed near multipath signals in receiving the plurality of spread spectrum chirp signals.

7. A method of estimating a distance between two radio frequency devices, comprising:
receiving a plurality of spread spectrum chirp signals transmitted from a transmitting radio frequency device frequency offset from one another;
evaluating the received plurality of spread spectrum chirp signals for relative phase shifts between the plurality of spread spectrum chirp signals; and
deriving a fine propagation time between the first and second devices using the phase shifts between the spread spectrum chirp signals.

8. The method of estimating a distance between two radio frequency devices of claim 7, further comprising determining a coarse propagation time established by propagation delay of at least one of the plurality of chirp signals plus known processing delays, and combining the coarse propagation delay and the fine propagation time to establish an accurate propagation time.

9. The method of estimating a distance between two radio frequency devices of claim 7, further comprising shifting a frequency domain despreading window in the receiver to reduce the influence of time-delayed near multipath signals in receiving the plurality of spread spectrum chirp signals.

10. A radio frequency device, comprising:
a radio frequency receiver operable to receive a plurality of spread spectrum chirp signals frequency offset from one another transmitted from a transmitting radio device; and
processing logic operable to evaluate the received plurality of spread spectrum chirp signals for relative phase shifts between the plurality of spread spectrum chirp signals and derive a fine propagation time between the first and second devices using the phase shifts between the spread spectrum chirp signals.

11. The radio frequency device of claim 10, the processing logic further operable to determine a coarse propagation time established by propagation delay of at least one of the plurality of chirp signals plus known processing delays, and combine the coarse propagation delay and the fine propagation time to establish an accurate propagation time.

12. The radio frequency device of claim 10, the processing logic further operable to shift a frequency domain despreading window to reduce the influence of time-delayed near multipath signals in receiving the plurality of spread spectrum chirp signals.

13. A method of estimating a distance between two radio frequency communication devices, comprising:
wirelessly transmitting a plurality of spread spectrum chirp signals frequency offset from one another from a first radio frequency communication device to a second radio frequency communication device, the plurality of spread spectrum chirp signals transmitted with a known phase relationship between signals;
evaluating, at the second radio frequency communication device, the received plurality of spread spectrum chirp signals for relative phase shifts between the plurality of spread spectrum chirp signals;
deriving a fine propagation time between the first and second devices using the phase shifts between the spread spectrum chirp signals; and
determining a location of the second radio frequency communication device based, at least in part, on the derived fine propagation time between the first and second radio frequency communication devices.

* * * * *